United States Patent
Millard et al.

(10) Patent No.: US 7,153,379 B2
(45) Date of Patent: Dec. 26, 2006

(54) METHODS OF PRODUCING A CERAMIC MATRIX COMPOSITE

(75) Inventors: Michael Lee Millard, Cincinnati, OH (US); Horace Richardson, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/966,649

(22) Filed: Oct. 15, 2004

(65) Prior Publication Data

US 2006/0081323 A1    Apr. 20, 2006

(51) Int. Cl.
*C04B 35/80* (2006.01)
*B32B 37/18* (2006.01)
*B32B 38/00* (2006.01)
*B32B 38/08* (2006.01)

(52) U.S. Cl. ............... 156/89.11; 156/93; 156/154; 156/155; 264/640; 264/642; 264/643

(58) Field of Classification Search ............ 156/89.26; 264/257, 313, 510
See application file for complete search history.

(56) References Cited

U.S. PATENT DOCUMENTS

| | | | |
|---|---|---|---|
| 4,464,192 A | 8/1984 | Layden et al. | |
| 4,581,053 A | 4/1986 | Prewo et al. | |
| 4,702,376 A * | 10/1987 | Pagliaro | 206/524.8 |
| 4,729,973 A | 3/1988 | Brockway et al. | |
| 4,780,432 A | 10/1988 | Minford et al. | |
| 4,936,939 A | 6/1990 | Woolum | |
| 4,942,013 A * | 7/1990 | Palmer et al. | 264/511 |
| 5,094,883 A | 3/1992 | Muzzy et al. | |
| 5,106,568 A | 4/1992 | Honka | |
| 5,126,087 A * | 6/1992 | Lespade et al. | 264/136 |
| 5,171,630 A | 12/1992 | Muzzy et al. | |
| 5,198,281 A | 3/1993 | Muzzy et al. | |
| 5,214,011 A | 5/1993 | Breslin | |
| 5,281,388 A * | 1/1994 | Palmer et al. | 264/571 |
| 5,322,665 A * | 6/1994 | Bernardon et al. | 264/571 |
| 5,494,867 A * | 2/1996 | Schwab et al. | 501/95.1 |
| 5,525,385 A | 6/1996 | Weinstein et al. | |
| 5,529,620 A | 6/1996 | Corbett et al. | |
| 5,605,868 A * | 2/1997 | Chyung et al. | 501/8 |
| 5,641,817 A | 6/1997 | Aghajanian et al. | |
| 5,660,923 A | 8/1997 | Bieler et al. | |
| 5,817,223 A | 10/1998 | Maloney | |
| 5,891,249 A | 4/1999 | Bieler et al. | |
| 5,955,194 A * | 9/1999 | Campbell | 428/366 |
| 5,984,055 A | 11/1999 | Strasser et al. | |
| 6,025,048 A | 2/2000 | Cutler et al. | |
| 6,174,595 B1 | 1/2001 | Sanders | |
| 6,391,436 B1 * | 5/2002 | Xu et al. | 428/298.1 |

(Continued)

FOREIGN PATENT DOCUMENTS

EP    0 331 860 A1    9/1989

(Continued)

*Primary Examiner*—Melvin Mayes
(74) *Attorney, Agent, or Firm*—McNees Wallace & Nurick LLC

(57) ABSTRACT

Methods are provided for producing a ceramic matrix composite by slurry infiltration. The methods involve placing a desized ceramic cloth lay-up into a non-ceramic cloth bag, sealing the bag to form a bagged ceramic preform, infiltrating the bagged ceramic preform with a ceramic-containing slurry, and sintering the preform to convert the slurry to a ceramic while decomposing the non-ceramic bag. The methods of the present invention maximize slurry infiltration of the ceramic cloth tow bundle while minimizing damage to the ceramic cloth.

14 Claims, 1 Drawing Sheet

U.S. PATENT DOCUMENTS

| | | |
|---|---|---|
| 6,497,776 B1 | 12/2002 | Butler et al. |
| 2002/0022422 A1* | 2/2002 | Waldrop et al. ............. 442/179 |
| 2002/0197465 A1* | 12/2002 | Butner et al. ............ 428/293.4 |
| 2003/0034113 A1* | 2/2003 | Butler et al. ............. 156/89.11 |
| 2003/0042659 A1* | 3/2003 | Benson et al. .............. 264/510 |
| 2003/0211194 A1* | 11/2003 | Louderback et al. ........ 425/389 |
| 2005/0035478 A1* | 2/2005 | Sewell et al. ............... 264/102 |
| 2005/0073076 A1* | 4/2005 | Woods et al. ............... 264/511 |

FOREIGN PATENT DOCUMENTS

| | | |
|---|---|---|
| EP | 0 549 224 A2 | 6/1993 |
| EP | 0 695 730 A2 | 2/1996 |
| GB | 2 347 113 A | 8/2000 |
| WO | WO 92/00182 | 1/1992 |
| WO | WO 93/14040 | 7/1993 |
| WO | WO 97/18081 | 5/1997 |

* cited by examiner

METHODS OF PRODUCING A CERAMIC MATRIX COMPOSITE

FIELD OF THE INVENTION

The invention concerns methods of producing a ceramic matrix composite by slurry infiltration. In particular, the invention concerns novel slurry infiltration methods of producing ceramic matrix composites (CMC). The methods of the present invention maximize slurry infiltration of the ceramic cloth tow bundle while minimizing damage to the ceramic cloth

BACKGROUND OF THE INVENTION

There are at least five known and current processes for forming CMCs using ceramic cloth. Those processes generally include: 1) prepregging, wherein ceramic cloth is run over a series of rollers and through tensioners, dipped into a slurry tank, dried in a tower, sandwiched between layers of plastic sheeting, and rolled onto a tube; 2) chemical vapor infiltration, wherein a preform of ceramic cloth plies is set inside a chemical vapor reactor, the preform is heated, and atoms or molecules in the form of vapor are deposited on and, hopefully, within the ceramic cloth; 3) lanxide process, wherein a special chemical is processed into ceramic cloth, and the ceramic cloth is dipped into a liquid metal bath that converts the special chemicals to ceramic materials; 4) melt infiltration, wherein the ceramic cloth preform is infiltrated with a liquid metal; after which the infiltrated preform is processed to convert the metal to a ceramic; and 5) slurry infiltration, wherein a ceramic particle containing slurry is vacuum infiltrated into the ceramic cloth preform, and the ceramic cloth preform is then heat treated to form the CMC.

Slurry infiltration processes are preferred when abrasion and other damage to the ceramic cloth fibers is a concern, and where complete infiltration of the cloth with a liquid ceramic precursor is desired. The problem with the slurry infiltration process is that it may require multiple infiltration/heat treatments to form a proper CMC. The number of infiltration/heat treatments is dependent upon the yield of ceramic material from the ceramic slurry. Additionally, known slurry infiltration methods yield incomplete infiltration of the tow bundle within the woven ceramic cloth. Another problem is that fiber damage results from mechanical handling of the ceramic cloth and during known slurry infiltration processes, especially in processes that use cleaned or desized ceramic cloths. Desizing is a cleaning process that removes the sizing on the fiber, and is performed prior to any infiltration. Incomplete tow bundle infiltration results in low strength areas in the CMC because there is insufficient matrix between the fibers to transfer load. Fiber damage in the ceramic cloth during infiltration is almost inherent in any process that requires rollers and tensioning devices due to the action of the fibers rolling over one another. The rolling action causes nicks in the fibers that result in CMC strength reduction. All of these problems yield CMCs with reduced structural properties and reliability.

Therefore, what is needed is a method of slurry infiltration that minimizes damage to the ceramic cloth, and that maximizes slurry infiltration of the tow bundles and fibers of the cloth.

SUMMARY OF THE INVENTION

The instant invention avoids the problems of the prior art by providing a processing method that maximizes tow bundle slurry infiltration while minimizing cloth damage such as by mechanical handling prior to infiltration, and also by the infiltration process. Thus, the invention addresses the problems of infiltration and cloth fiber damage concurrently.

To overcome the problem of fiber damage prior to and during the infiltration process, the invention provides a method of fabricating a preform of ceramic cloth. Specifically, the ceramic cloth preform is produced by cutting plies of sized ceramic cloth, laying up the plies per the design specifications, desizing the ceramic cloth lay-up by heat cleaning in a furnace, removing the desized lay-up and inserting it into a fugitive bag for further processing. This method results in a preform which requires minimal handling of the ceramic cloth, especially in the cleaned or desized condition, thereby minimizing potential for fiber damage. The present invention further provides a novel slurry infiltration process that maximizes tow bundle infiltration.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE DRAWINGS/INVENTION

Figure 1:
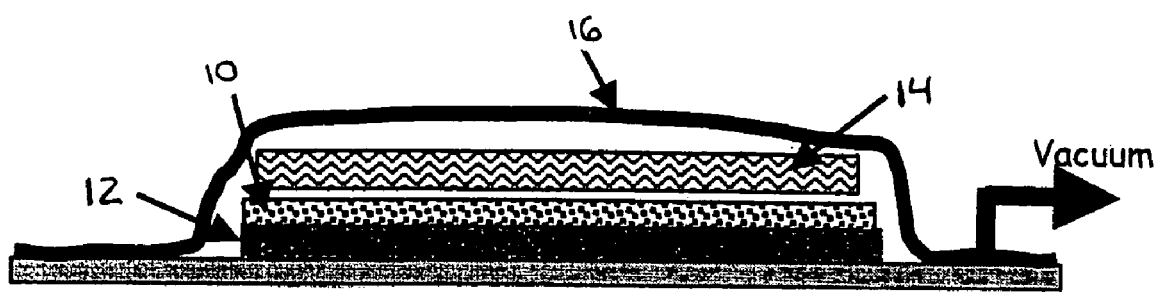
FIG. 1 is a side elevation view that illustrates a sandwich containing a thick open weave bag material, a ceramic cloth preform, and a fabrication tool enclosed in a vacuum-type slurry infiltration system.

The methods of the present invention begin with the cutting of one or more plies of a ceramic cloth into a desired shape and orientation for the preform. The ceramic cloth used for the preform may be multiple layers of unidirectional ply laid at predetermined angles with respect to one another, or woven cloth. In one embodiment, first, at least one ply, and preferably multiple plies, of sized ceramic cloth are laid up in accordance with a design specification. Next, the laid-up plies are desized by heating, such as in a cleaning furnace, to at least about 800° F. The desizing step is performed to remove any sizing material that the fiber manufacturer uses on the fibers to coat the fiber so that the ceramic fibers won't abraid each other during weaving or other types of handling. Desizing is performed because the sizing interferes with bonding in a CMC. Because most sizings are polyvinyl alcohol ("PVA") or epoxy-based, desizing can be performed by heating the ceramic cloth to a temperature and time sufficient to decompose the sizing and burn off any residual carbon. Any temperature above about 800° F. is typically sufficient so long as the cloth remains in the furnace for a long enough time to remove the carbon. The upper end temperature is a temperature that doesn't degrade the mechanical performance of the ceramic fibers, and is in excess of about 800° F. Preferably, desizing is performed at about 1200° F. because the sizing is completely decomposed at this temperature.

The desized ceramic cloth lay-up is carefully removed from the furnace and set inside a fugitive bag made of non-ceramic material, such as a woven bag of cotton, polyester, nylon, or other non-ceramic material. The fugitive bag may have three closed sides with one open end, may be a tube having two opposed open sides formed by the sidewalls, or may have three open sides. In any case, the bag has at least one opening so that the ceramic cloth lay-up can be inserted into the bag. The ends of the bag are then sealed by sealing means, such as by taping, gluing, hot gluing, sewing, stitching, stapling, or other mans known to those skilled in the art, thereby forming a bagged ceramic preform. The bagged preform is next placed in a slurry infiltration unit, especially for simple shapes and flat panels. Optionally, some sewing or stitching may be performed on the bagged preform (through the bag and ceramic cloth, or simply through the bag) to further stabilize the preform, and also to produce more complex shapes. The stitches are preferably located in low stress areas as indicated by the design analysis.

The bagged preform is eventually mated to the fabrication tool to impart a desired shape. The timing of the mating to the fabrication tool can be varied since it is dependent upon the characteristics of the part, particularly size and shape. For example, for small shapes or relatively flat panels, the preform bag is placed on the fabrication tool, the bag and tool are placed into a slurry infiltration chamber, an airweave material is placed on top of the bag, and then the airweave is soaked with slurry. For large or relatively complex shapes, the process involves infiltrating a relatively flat, stitched preform bag, removing it from the infiltration unit, then laying the infiltrated bagged preform on the mating tool. For example, in one embodiment for simple shapes such as a flat plates or shapes with simple contours, the ceramic cloth is cut and laid up on a piece of fugitive bag material, covered with another bag cloth layer, and set in the slurry infiltration unit for infiltration. In another embodiment suitable for more complex shapes such as circular or convex shapes, or shapes with hard contours or corners, the ceramic cloth plies are laid up, desized, and placed in a fugitive bag. The fugitive bag with the plies inside it is stitched at preselected locations to keep the plies from losing their orientation, bunching up, or wrinkling during subsequent manipulation on the fabrication tool. In any embodiment, the bagged preform is mated to the fabrication tool for shaping prior to laminating. Finally, sintering of the laminated part converts the ceramic-containing slurry and ceramic cloth to ceramic to form a CMC.

Using these methods, minimal fiber damage to the ceramic cloth occurs during the preform stabilization process. This is in part because the cutting and laying-up operations are performed in the sized condition, and in part because the bag protects the desized, laid up ceramic cloth plies.

As shown in FIG. 1, the present invention further provides novel methods for optimizing the infiltration of the ceramic slurry into the stabilized ceramic material preform. In the preferred embodiment of FIG. 1, the method involves pulling the slurry into the preform using a vacuum and a closed system. In this embodiment, the bagged ceramic cloth preform 10 is placed on a shape-forming mold 12. Next, a thick open weave material 14 (sometimes known as "air weave" to those skilled in the art), such as polyester air weave material, is soaked with ceramic slurry to form a soaked open weave material 14. In a preferred embodiment, the open weave material is ⅛-inch thick polyester air weave. The soaked open weave material 14 is placed adjacent the bagged cloth preform 10, preferably between the mold 12 and the bagged ceramic cloth preform 10. Next, the bagged ceramic cloth preform 10, mold 12, and ceramic-containing thick open weave 14 sandwich is sealed in a closed container system such as a plastic or silicone vacuum bag 16. A vacuum is pulled on the system, forcing the migration of the ceramic slurry from the soaked open weave material 14 into the bagged ceramic cloth preform 10. The pressure from the vacuum bag 16 on the bagged ceramic cloth preform 10 maintains the ceramic plies in intimate contact with each other, the fugitive bag material, and the open weave material 14. Additionally, the surface tension of the fibers and the vacuum draw promote excellent infiltration of the ceramic slurry into the tow bundles The open weave material is selected so that it will not preferentially filter out any of the constituents of the slurry. Thus, the slurry readily migrates through the open weave material, the fugitive bag, and into the ceramic cloth of the bagged ceramic cloth preform 10.

In a step following slurry infiltration, the infiltrated preform is dried. Any known method of drying can be utilized, but room-temperature air drying is preferred to allow supplemental migration of the slurry throughout the plies of the preform, and to avoid additional handling which can promote damage to the wet ceramic cloth fibers. The time required for drying is dependent upon the thickness of the preform, the type and quantity of solvents in the ceramic slurry, and on room temperature and airflow around the preform.

The dried preform is next laminated to consolidate the ceramic cloth and slurry under temperature and pressure. Upon lamination, the non-ceramic bag material of the preform becomes the outer surface layer of the laminated part, but substantially decomposes during subsequent sintering of the laminated part as the bag material is the lower temperature material such as carbon-based fiber, which decomposes on exposure to oxygen or air at an elevated temperature at or below the sintering temperature of the laminated part. The laminated part is next sintered to convert the ceramic slurry in the ceramic preform to a ceramic matrix, yielding a CMC. Additionally, the sintering step decomposes the bag material leaving a soft matrix material on the surface of the part. The soft matrix material, as well as any excess slurry matrix that remained in the bag material, is easily removed by a light hand sanding or by sand blasting.

The following disclosure is exemplary, and is intended to illustrate two non-limiting embodiments the invention.

EXAMPLE 1

Nextel 720-cloth (3M Corporation) reinforced alumina-silica ($Al_2O_3$—$SiO_2$) matrix CMC (designated AS-N720). In this example, ceramic preforms were created by laying together plies of Nextel 720 cloth, desizing the lay-up at about at least 1200° F., inserting the desized lay-up into a cotton cloth bag and taping the ends of the bag with polytetrafluroethylene (PTFE) tape such as Teflon® brand tape from DuPont. The preforms were then overlaid with ⅛-inch thick open weave material soaked with ceramic slurry including sub-micron alumina powder, a silica-yielding polymer, solvents and deflocculents, as described by U.S. Pat. No. 5,306,554, which is hereby incorporated by reference. The sandwich was placed in a silicone vacuum bag and a vacuum of greater than about 20 in. Hg drawn for a period of greater than about 15 minutes to infiltrate the slurry into the ceramic preform. The slurry-infiltrated preforms were dried overnight in ambient air and then laminated at or above nominal laminating conditions of about 200 psi at about 300° F. The laminating process successfully consolidated and hardened the ceramic preforms into a "green" shape by curing the silica-yielding polymer. The specimens were then sintered for a sufficient time and at a temperature sufficient, such as at least about four hours at about 1800° F., to convert the silica-yielding polymer to a ceramic matrix and bond the composite constituents together to form the CMC.

EXAMPLE 2

Nextel 440 cloth (3M Corporation) reinforced silica ($SiO_2$) matrix CMC (designated S-N440). In this example, ceramic preforms were created by laying together plies of Nextel 440 cloth, desizing the lay-up at about 1200° F., inserting the desized lay-up into a cotton bag and taping the ends of the bag with polyterafluroethylene (PTFE) tape, such as Teflon® brand tape from DuPont. The preforms were then overlaid with ⅛-inch thick open weave material soaked with ceramic slurry, such as set forth in Example 1. The slurry for the S-N440 system includes sub-micron silica, a silica-yielding polymer, solvents and deflocculents as defined by U.S. Pat. No. 5,306,554. This sandwich was placed in a silicone vacuum bag and a vacuum of greater than about 20 in. Hg drawn for a period of greater than about 15 minutes to infiltrate the slurry into the ceramic preform. The slurry-infiltrated preforms were dried overnight in ambient air and then laminated at or above nominal laminating conditions of about 200 psi at about 300° F. The laminating process successfully consolidated and hardened the ceramic preforms into a "green" shape by curing the silica-yielding polymer. The specimens were then sintered for a sufficient time and at a temperature sufficient, in this case about 4 hours at about at least about 1600° F., to convert the silica-yielding polymer to a ceramic matrix and bond the composite constituents together to form the CMC.

Results: A comparison of the structural property enhancements we have obtained so far are shown in the following table:

| Process | AS-N720 Avg. Flex Strength | S-N440 Avg. Flex Strength |
|---|---|---|
| Prepreg (Hexcel method) | 22 ksi | — |
| Hand Prepreg ** | 25–27 ksi | 15 ksi |
| Infiltration of Ceramic Preform Using Methods of the Present Invention | 32 ksi | 18–20 ksi |

* Laminating and sintering are identical between the three methods
** Hand Prepreg - The slurry is applied to the ceramic cloth using a paint roller in a similar method to painting a wall.

The present invention yields a perform with at least 20% improvement of average flex strength than other materials and at least about 20% improvement for S-N440 material, that is, a CMC comprising substantially the same materials but made by different methods.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of forming a ceramic matrix composite component, the method comprising the steps of:
    cutting at least one ply of a ceramic cloth into a preselected shape;
    laying up the at least one ply in accordance with a design specification;
    heating the at least one ply to a temperature sufficient to clean and desize the at least one ply;
    placing the at least one cleaned and desized ply into a bag formed from non-ceramic material, the bag having at least one opening;
    closing the at least one opening of the bag using sealing means to form a bagged ceramic perform; and
    further comprising the step of stabilizing the bagged ceramic preform by stitching through the bagged ceramic preform.

2. A method of forming a ceramic matrix composite component, the method comprising the steps of:
    cutting at least one ply of a ceramic cloth into a preselected shape;
    laying up the at least one ply in accordance with a design specification;
    heating the at least one ply to a temperature sufficient to clean and desize the at least one ply;
    placing the at least one ply into a bag formed from non-ceramic material selected to permit infiltration of a ceramic slurry through the bag under vacuum, the bag having at least one opening;
    closing the at least one opening of the bag using sealing means to form a bagged ceramic preform; and
    of stabilizing the bagged ceramic preform by stitching through the bagged ceramic preform.

3. A method of forming a ceramic matrix composite component, the method comprising the steps of:
    cutting at least one ply of a ceramic cloth into a preselected shape;
    laying up the at least one ply in accordance with a design specification;
    heating the at least one ply to a temperature sufficient to clean and desize the at least one ply;
    placing the at least one cleaned and desized ply into a bag formed from non-ceramic material, the bag having at least one opening; and
    closing the at least one opening of the bag using sealing means to form a bagged ceramic perform;
    further comprising the step of infiltrating the bagged ceramic perform with a ceramic-containing slurry, wherein the step of infiltrating the bagged ceramic perform comprises the steps of:
    placing the bagged ceramic preform into a slurry infiltration unit;
    placing the bagged ceramic preform on a shape-forming mold;
    placing the bagged ceramic preform and shape forming mold into a vacuum-type slurry infiltration unit; and
    infiltrating the bagged ceramic preform, wherein the step of infiltrating the bagged ceramic preform comprises the steps of:
    providing an open weave material;
    soaking the open weave material with a ceramic-containing slurry;
    placing the soaked open weave material in substantial contact with the non-ceramic bag material of the bagged ceramic preform to form a sandwich;
    sealing the sandwich in a vacuum-type slurry infiltration unit; and operating the slurry infiltration unit to draw the slurry out of the open weave material and into the ceramic cloth of the bagged ceramic preform to form an infiltrated bagged ceramic preform.

4. The method of claim 3, farther comprising the step of drying the infiltrated bagged preform to form an infiltrated dried bagged preform.

5. The method of claim 4, wherein the step of drying the infiltrated bagged preform is performed in ambient conditions.

6. The method of claim 4, flirt her comprising the step of: laminating the infiltrated dried bagged ceramic preform to consolidate the infiltrated dried bagged ceramic preform.

7. The method of claim 6, farther comprising the step of, after consolidating: sintering the dried infiltrated bagged ceramic preform at a temperature sufficient to convert the ceramic-containing slurry in the preform to a ceramic and to decompose the non-ceramic bag material to form a CMC component.

8. The method of claim 7, farther comprising the step of, after sintering:
removing the decomposed non-ceramic bag material.

9. The method of claim 8, wherein the step of removing the decomposed non-ceramic bag material includes sanding the CMC component.

10. The method of claim 8, wherein the step of removing the decomposed non-ceramic bag material includes sandblasting the CMC component.

11. A method of forming a ceramic matrix composite component, the method comprising the steps of:
cutting at least one ply of a ceramic cloth into a preselected shape;
laying up the at least one ply in accordance with a design specification;
heating the at least one ply to a temperature sufficient to clean and desize the at least one ply;
placing the cleaned and desized ply into a bag formed from non-ceramic material, the bag having at least one opening;
closing the at least one opening of the bag using sealing means to form a bagged ceramic preform;
stabilizing the bagged ceramic prefrom;
mating the bagged ceramic preform to a fabrication tool;
providing an open weave material;
soaking the open weave material with a ceramic-containing slurry;
placing the soaked open weave material in substantial contact with the non-ceramic bag material of the bagged ceramic preform to form a sandwich;
sealing the sandwich in a vacuum-type slurry infiltration unit;
operating the slurry infiltration unit to draw the slurry out of the open weave material and into the ceramic cloth of the bagged ceramic preform to form an infiltrated bagged ceramic preform; and
drying the infiltrated bagged preform.

12. The method of claim 11, further comprising the steps of:
laminating the infiltrated bagged ceramic preform to consolidate the infiltrated bagged ceramic preform; and
sintering the infiltrated bagged ceramic preform at a temperature sufficient to convert the ceramic-containing slurry in the preform to a ceramic and to decompose the non-ceramic bag material to form a CMC component.

13. The method of claim 11, wherein the step of stabilizing the preform comprises stitching through the bagged ceramic preform.

14. A method of forming a ceramic matrix composite component, the method comprising the steps of:
cutting at least one ply of a ceramic cloth into a preselected shape;
laying up the at least one ply in accordance with a design specification
heating the at least one ply to a temperature sufficient to clean and desize the at least one ply;
placing the at least one ply into a bag formed from non-ceramic material selected to permit infiltration of a ceramic slurry through the bag under vacuum, the bag having at least one opening;
closing the at least one opening of the bag using sealing means to form a bagged ceramic preform; and
infiltrating the bagged ceramic preform with a ceramic-containing slurry,
wherein the step of infiltrating the bagged ceramic preform farther comprises the steps of:
placing the bagged ceramic preform on a shape-forming mold;
placing the bagged ceramic preform and shape forming mold into a slurry infiltration unit; and
infiltrating the bagged ceramic preform,
wherein the step of placing the bagged ceramic preform into a slurry infiltration unit includes placing the preform into a vacuum-type slurry infiltration unit, and wherein the step of infiltrating the bagged ceramic preform comprises the steps of:
providing an open weave material;
soaking the open weave material with a ceramic-containing slurry;
placing the soaked open weave material in substantial contact with the non-ceramic bag material of the bagged ceramic preform to form a sandwich;
sealing the sandwich in a vacuum-type slurry infiltration unit; and operating the slurry infiltration unit to draw the slurry out of the open weave material and into the ceramic cloth of the bagged ceramic preform to form an infiltrated bagged ceramic perform.

* * * * *

UNITED STATES PATENT AND TRADEMARK OFFICE
CERTIFICATE OF CORRECTION

PATENT NO. : 7,153,379 B2  
APPLICATION NO. : 10/966649  
DATED : December 26, 2006  
INVENTOR(S) : Millard et al.

It is certified that error appears in the above-identified patent and that said Letters Patent is hereby corrected as shown below:

Claim 2, Col. 6, Line 32, "of stabilizing" should be --stabilizing--

Claim 4, Col. 7, Line 5, "farther" should be --further--

Claim 6, Col. 7, Line 11, "flirt her" should be --further--

Claim 7, Col. 7, Line 14, "farther" should be --further--

Claim 14, Col. 8, Line 31, "farther" should be --further--

Signed and Sealed this

Fifteenth Day of May, 2007

JON W. DUDAS  
*Director of the United States Patent and Trademark Office*